United States Patent
Böhler et al.

(10) Patent No.: US 12,030,393 B2
(45) Date of Patent: Jul. 9, 2024

(54) VEHICLE CHARGING SYSTEM FOR CHARGING AN ENERGY STORE ARRANGED IN A VEHICLE

(71) Applicant: BRUSA Elektronik AG, Sennwald (CH)

(72) Inventors: Lukas Böhler, Wangs (CH); Marc Hanselmann, Frümsen (CH); Marc Bosch, Sennwald (CH)

(73) Assignee: BRUSA Elektronik AG, Sennwald (CH)

( * ) Notice: Subject to any disclaimer, the term of this patent is extended or adjusted under 35 U.S.C. 154(b) by 693 days.

(21) Appl. No.: 17/252,657

(22) PCT Filed: Jun. 24, 2019

(86) PCT No.: PCT/EP2019/066672
§ 371 (c)(1),
(2) Date: Dec. 15, 2020

(87) PCT Pub. No.: WO2020/002237
PCT Pub. Date: Jan. 2, 2020

(65) Prior Publication Data
US 2021/0252986 A1    Aug. 19, 2021

(30) Foreign Application Priority Data

Jun. 29, 2018 (DE) .................... 10 2018 115 784.3

(51) Int. Cl.
*B60L 53/12* (2019.01)
*B60L 53/122* (2019.01)
(Continued)

(52) U.S. Cl.
CPC ............. *B60L 53/12* (2019.02); *B60L 53/122* (2019.02); *B60L 53/39* (2019.02); *B60L 53/62* (2019.02); *H02J 50/10* (2016.02); *H02J 50/90* (2016.02)

(58) Field of Classification Search
CPC .......... B60L 53/12; B60L 53/62; B60L 53/39; B60L 53/122; H02J 50/10; H02J 50/90
(Continued)

(56) References Cited

U.S. PATENT DOCUMENTS

2013/0033224 A1   2/2013  Raedy
2017/0136906 A1*  5/2017  Draeger .................. H02J 50/90
(Continued)

FOREIGN PATENT DOCUMENTS

DE   102010012356 A1   9/2011
DE   102014215350 A1   2/2016
(Continued)

OTHER PUBLICATIONS

Machine Translation of EP3103674, 47 pages (Year: 2016).*
(Continued)

*Primary Examiner* — Nathaniel R Pelton
(74) *Attorney, Agent, or Firm* — Hoffmann and Baron, LLP (57) ABSTRACT

A system for charging an energy store in a vehicle and a method for operating the system, wherein the system includes a first transmission unit having a primary coil, arranged outside the vehicle in a stationary manner, and a second transmission unit having a secondary coil, arranged in the vehicle, wherein energy is transmitted via inductive energy transmission from the primary coil to the secondary coil to charge the energy store. The second transmission unit has a signal generator for generating and coupling signals into the secondary coil for transmission via the secondary (Continued)

coil, and the first transmission unit has an evaluation unit, a first auxiliary coil, and a second auxiliary coil, wherein the evaluation unit is designed to ascertain a magnetic coupling and/or a relative position between the first transmission unit and the second transmission unit based on the signals received by the primary coil and the auxiliary coils.

12 Claims, 2 Drawing Sheets

(51) Int. Cl.
    *B60L 53/39*     (2019.01)
    *B60L 53/62*     (2019.01)
    *H02J 50/10*     (2016.01)
    *H02J 50/90*     (2016.01)

(58) Field of Classification Search
    USPC ........................................................ 320/108
    See application file for complete search history.

(56) References Cited

U.S. PATENT DOCUMENTS

2020/0244108 A1*   7/2020   Kim ..................... H02J 50/80
2020/0290467 A1*   9/2020   Gao ....................... H02J 7/02

FOREIGN PATENT DOCUMENTS

| DE | 102016214036 A1 | 2/2018 |
|----|-----------------|--------|
| EP | 3103674 | * 12/2016 |
| EP | 3103674 A1 | 12/2016 |

OTHER PUBLICATIONS

English-language translation of International Preliminary Report on Patentability issued in International Application No. PCT/EP2019/066672 on Jan. 7, 2021.

* cited by examiner

VEHICLE CHARGING SYSTEM FOR CHARGING AN ENERGY STORE ARRANGED IN A VEHICLE

CROSS-REFERENCE TO RELATED APPLICATIONS

The present application is the U.S. National Phase of PCT/EP2019/066672, filed on Jun. 24, 2019, which claims priority to German Patent Application No. 10 2018 115 784.3, filed on Jun. 29, 2018, the entire contents of which are incorporated herein by reference.

BACKGROUND

Field

The invention relates to a vehicle charging system for charging an energy store arranged in a vehicle, including a first transmission unit GPM (Ground Pad Module), which has a primary coil with a coil axis $SPA_P$ and is arranged outside of the vehicle in a stationary manner in particular, and a second transmission unit CPM (Car Pad Module), which has a secondary coil with a coil axis $SPA_S$ and is arranged in the vehicle, wherein energy is transmitted via an inductive energy transmission from the primary coil to the secondary coil. The invention also relates to a method for operating such a vehicle charging system.

Related Art

Vehicle charging systems of the generic type are known in the prior art. The energy transmission for charging the energy store requires, for safety reasons and for reasons of efficiency, that the primary coil and the secondary coil, which are designed, in particular, as flat coils, have the smallest possible spacing and are arranged above one another as far as possible. This achieves optimum magnetic coupling between the primary coil and the secondary coil, which enables optimum inductive energy transmission.

SUMMARY

The object of the invention is to develop a generic vehicle charging system in a way that enables simultaneous, robust and simple ascertainment of a relative position between the first transmission unit GPM and the second transmission unit CPM or a variable derived therefrom, as well as a magnetic coupling between the primary coil and the secondary coil or a variable derived therefrom.

The invention results from the features of the independent claims. Advantageous further refinements and embodiments are the subject of the dependent claims. Further features, potential applications, and advantages of the invention result from the following description and from the explanation of embodiments of the invention, which are shown in the drawings.

A first aspect of the invention relates to a vehicle charging system for charging an energy store arranged in a vehicle F, including a first transmission unit GPM, which has a primary coil with a coil axis $SPA_P$ and is arranged outside of the vehicle F in a stationary manner, and a second transmission unit CPM, which has a secondary coil with a coil axis $SPA_S$ and is arranged in the vehicle F, wherein energy is transmitted via an inductive energy transmission from the primary coil to the secondary coil.

The vehicle charging system according to the invention is characterized in that the second transmission unit CPM has a signal generator SG for generating signals $SIG_{SG}$, the signal generator coupling the signals $SIG_{SG}$ into the secondary coil in order to transmit the signals via the secondary coil, and in that the first transmission unit GPM has an evaluation unit and at least one first auxiliary coil with a coil axis $SPA_{H1}$ and one second auxiliary coil with a coil axis $SPA_{H2}$, the evaluation unit being designed to ascertain and provide for further use at an interface a magnetic coupling $k_{mag}$ and/or a relative position $\Delta POS$ between the first transmission unit GPM and the second transmission unit CPM on the basis of the signals $SIG_{SG}$ received by the primary coil and the auxiliary coils.

The vehicle F is, in particular, an electric vehicle or a hybrid vehicle with an electric drive and an internal combustion engine. The vehicle F is preferably designed and configured in such a way that longitudinal and/or lateral control of the vehicle F takes place autonomously and depending on the currently ascertained magnetic coupling $k_{mag}$ and/or the currently ascertained relative position $\Delta POS$ such that an optimum relative arrangement of the first transmission unit GPM and the second transmission unit CPM takes place before the inductive energy transmission from the primary coil to the secondary coil in order to charge the energy store is initiated. The energy store is advantageously an electric battery.

The interface is advantageously an interface of the evaluation unit. The interface is advantageously connected to the control unit of the first transmission unit GPM, which controls the process for inductive energy transmission to the second transmission unit CPM. The interface is also advantageously connected to a transmission unit that is designed and configured to wirelessly transmit the provided information to the second transmission unit CPM. For this purpose, the second transmission unit CPM has a corresponding receiving unit. Both the transmitting unit of the first transmission unit GPM and the receiving unit of the second transmission unit CPM are advantageously designed as a transmitting/receiving unit.

Because the signals $SIG_{SG}$ are coupled into the secondary coil in the present case, the secondary coil serves on the one hand as a transmitting antenna (transmitting coil) for transmitting the signals $SIG_{SG}$, and on the other hand as a receiving coil for receiving the magnetic energy inductively transmitted by the primary coil in order to charge the energy store.

According to the invention, such a double function is also intended for the primary coil. On the one hand, the primary coil is used to transmit the energy for charging the energy store to the secondary coil; on the other hand, the primary coil and the first and second auxiliary coils are used to receive the signals $SIG_{SG}$ transmitted by the primary coil. The primary coil and the secondary coil are dimensioned in such a way that the inductive transmission of the energy for charging the energy store can take place.

These dual functions of the primary and secondary coils mean that additional receiving/transmitting coils that would otherwise be required can be saved. The proposed vehicle charging system makes it possible, in particular, to ascertain and make available for further use a relative position or a distance and/or at the same time a magnetic coupling.

According to the invention, the evaluation unit is designed and configured in such a way that a magnetic coupling $k_{mag}$ and/or the relative position $\Delta POS$ between the first transmission unit GPM and the second transmission unit CPM is ascertained on the basis of the signals $SIG_{SG}$ received by the primary coil and the auxiliary coils.

At least the first auxiliary coil and the second auxiliary coil are advantageously arranged and/or oriented relative to the primary coil and relative to one another. A total of three, four, five or six auxiliary coils are advantageously available in order to receive the signals $SIG_{SG}$. In the present case, the auxiliary coils are positioned differently on the first transmission unit GPM. The auxiliary coils are also advantageously oriented differently.

In a particularly preferred embodiment, the coil axes $SPA_{H1}$ and $SPA_{H2}$ are each aligned substantially orthogonally with respect to the coil axis $SPA_P$ of the primary coil and substantially orthogonally with respect to one another. In the present case, the term "substantially" means that deviations within the range of up to 10° from pure orthogonality) (90°, i.e., 90°±10°, are also included.

The evaluation unit is advantageously designed and configured to ascertain the relative position $\Delta POS$ on the basis of the respective amplitudes and/or the phase positions of the signals $SIG_{SG}$ received by the primary coil and the auxiliary coils. The relative position $\Delta POS$ advantageously indicates a relative position of the primary coil and the secondary coil. The distance between the primary coil and the secondary coil is advantageously also ascertained from the relative position $\Delta POS$ in the evaluation unit. The relative position $\Delta POS$ is a two-dimensional relative position $\Delta POS(\Delta x, \Delta y)$ or a three-dimensional relative position $\Delta POS(\Delta x, \Delta y, \Delta z)$. The relative position can, of course, also be specified in coordinates other than Cartesian coordinates.

The evaluation unit advantageously ascertains the magnetic coupling $k_{mag}$ on the basis of a voltage $U_2$ generated in the secondary coil for the transmission of the signal $SIG_{SG}$ or on the basis of a current $I_2$ generated in the secondary coil, a voltage $U_1$ or current $I_1$ induced in the primary coil on receipt of the signal $SIG_{SG}$, and the predefined self-inductances L1 and L2 of the primary coil and the secondary coil.

The evaluation unit advantageously uses the following relationship to ascertain the magnetic coupling $k_{mag}$:

$$k_{mag} = \frac{U_1 \cdot L_2}{U_2 \cdot \sqrt{L_1 \cdot L_2}}. \quad (1)$$

The first transmission unit GPM and the second transmission unit CPM are advantageously designed and configured for wireless communication with one another. For this purpose, each of the transmission units advantageously includes a transmitting/receiving unit. A WLAN protocol is advantageously used for wireless communication between the first transmission unit GPM and the second transmission unit CPM. This wireless communication link is advantageously used in principle to exchange required information between the first transmission unit GPM and the second transmission unit CPM in order to securely and optimally carry out the entire process of transmitting energy from the first transmission unit GPM to the second transmission unit CPM. For example, an identifier of CPM and GPM, status information of CPM and GPM, start and stop signals at the start and at the end of the energy transmission in order to charge the energy store, etc., are exchanged via this communication link.

In the present case, the voltage $U_2$ generated in the secondary coil for the transmission of the signal $SIG_{SG}$ or the generated current $I_2$ is advantageously transmitted from the second transmission unit CPM to the first transmission unit GPM via this communication link. The self-inductance L2 of the secondary coil is also advantageously transmitted from the second transmission unit CPM to the first transmission unit GPM via this communication link.

The transmission of signals $SIG_{SG}$ is advantageously ended by the second transmission unit CPM when the magnetic coupling $k_{mag}$ is greater than a predefined limit value G1. The limit value G1 is advantageously selected in such a way that when the limit value G1 is exceeded, there is already an optimum magnetic coupling $k_{mag}$ that ensures efficient inductive energy transmission. The transmission of signals $SIG_{SG}$ is advantageously only ended if, in addition, the relative position $\Delta POS$ does not change for a predefined time period $\Delta t$ such that it can be assumed that the vehicle F is parked in such a way that the first transmission unit GPM is optimally arranged relative to the second transmission unit CPM for inductive energy transmission.

The first transmission unit GPM advantageously transmits the relative position $\Delta POS$ ascertained by the evaluation unit or a distance $D_{GPM\text{-}CPM}$ between the first and the second transmission unit ascertained by the expansion unit from the relative position $\Delta POS$ to the second transmission unit CPM, the second transmission unit CPM ending the transmission of signals $SIG_{SG}$ when the distance $D_{GPM\text{-}CPM}$ ascertained from the relative position $\Delta POS$ is smaller than a predefined limit value G2. The transmission of signals $SIG_{SG}$ is advantageously only ended if, in addition, the relative position $\Delta POS$ does not change for a predefined time period $\Delta t$ such that it can be assumed that the vehicle F is parked in such a way that the first transmission unit GPM is optimally arranged relative to the second transmission unit CPM for inductive energy transmission.

The transmission of signals $SIG_{SG}$ is advantageously ended when it is ensured that the first transmission unit GPM is optimally positioned in relation to the second transmission unit CPM and that the energy transmission in order to charge the energy store is initialized, because errors in data communication cannot be ruled out in the case of simultaneous transmission of the signals $SIG_{SG}$ and inductive energy transmission in order to charge the energy store.

The first transmission unit advantageously has a control unit that is designed and configured in such a way that the energy transmission from the primary coil to the secondary coil in order to charge the energy store is only initialized when the (currently) ascertained magnetic coupling $k_{mag}$ is greater than a predefined limit value G3 and/or when the distance $D_{GPM\text{-}CPM}$ ascertained from the relative position $\Delta POS$ between the first transmission unit GPM and the second transmission unit CPM is smaller than a predefined limit value G4. The limit value G3 is advantageously less than or equal to the limit value G1. The limit value G4 is advantageously greater than or equal to the limit value G2.

The ascertained magnetic coupling $k_{mag}$ or a variable ascertained therefrom and/or the ascertained relative position $\Delta POS$ or a variable ascertained therefrom, in particular, the distance $D_{GPM\text{-}CPM}$ between the first transmission unit GPM and the second transmission unit CPM, is advantageously provided in the vehicle F via the communication link, in particular, in order to be output in vehicle F and/or to enable automatic longitudinal and/or lateral control of the vehicle for optimum positioning of the second transmission unit CPM above the first transmission unit.

A second aspect of the invention relates to a vehicle charging system for charging an energy store arranged in a vehicle F, including a first transmission unit GPM, which has a primary coil with a coil axis $SPA_P$ and is arranged outside of the vehicle in a stationary manner, and a second transmission unit CPM, which has a secondary coil with a coil axis $SPA_S$ and is arranged in the vehicle, wherein energy is transmitted via an inductive energy transmission from the primary coil to the secondary coil. The vehicle charging system according to the second aspect of the invention is characterized in that the first transmission unit GPM has a signal generator SG for generating signals $SIG_{SG}$, the signal generator coupling the signals $SIG_{SG}$ into the primary coil in order to transmit the signals, and in that the second transmission unit CPM has an evaluation unit and at least one first auxiliary coil with a coil axis $SPA_{H1}$ and one second auxiliary coil with a coil axis $SPA_{H2}$, the evaluation unit being designed to ascertain and provide for further use at an interface a magnetic coupling $k_{mag}$ and/or a relative position $\Delta POS$ between the first transmission unit GPM and the second transmission unit CPM on the basis of the signals $SIG_{SG}$ received by the secondary coil and the auxiliary coils.

In contrast to the vehicle charging system according to the first aspect of the invention, in the vehicle charging system according to the second aspect of the invention, the signals $SIG_{SG}$ are transmitted by the first transmission unit GPM. Accordingly, in the vehicle charging system according to the second aspect, the second transmission unit CPM is equipped with an evaluation unit and at least one first and second auxiliary coil for receiving and evaluating the signals $SIG_{SG}$. The advantageous embodiments of the vehicle charging system according to the second aspect and the advantages thereof arise from an analogous and appropriate transfer of the above statements relating to the first aspect of the invention, in particular as follows.

The interface is advantageously an interface of the evaluation unit. The interface is advantageously connected to the control unit of the second transmission unit CPM, which controls the process for receiving the energy inductively transmitted by the first transmission unit GPM. The interface is also advantageously connected to a transmission unit that is designed and configured to transmit the provided information to the first transmission unit GPM. The transmitting unit is advantageously designed as a transmitting/receiving unit.

The first auxiliary coil and the second auxiliary coil are advantageously arranged and oriented relative to the secondary coil and relative to one another. The coil axes $SPA_{H1}$ and $SPA_{H2}$ are advantageously each aligned substantially orthogonally with respect to the coil axis $SPA_P$ of the secondary coil and substantially orthogonally with respect to one another. The evaluation unit advantageously ascertains the relative position $\Delta POS$ on the basis of the respective amplitudes and phase positions of the signals $SIG_{SG}$ received by the secondary coil and the auxiliary coils.

The evaluation unit advantageously ascertains the magnetic coupling $k_{mag}$ on the basis of a voltage $U_1$ generated in the primary coil for the transmission of the signal $SIG_{SG}$ or on the basis of a current $I_1$ generated in the primary coil, a voltage $U_2$ or current $I_2$ induced in the secondary coil on receipt of the signal $SIG_{SG}$, and the predefined self-inductances L1 and L2 of the primary coil and the secondary coil.

The first transmission unit GPM advantageously transmits the voltage $U_1$ or the current $I_1$ generated in the primary coil for the transmission of the signal $SIG_{SG}$ to the second transmission unit CPM. The first transmission unit GPM advantageously transmits the self-inductance L1 of the primary coil to the second transmission unit CPM.

The first transmission unit GPM advantageously ends the transmission of signals $SIG_{SG}$ when the magnetic coupling $k_{mag}$ is greater than a predefined limit value G1.

The second transmission unit CPM advantageously transmits the relative position $\Delta POS$ or a distance $D_{GPM\text{-}CPM}$ between the first and the second transmission unit ascertained from the relative position $\Delta POS$ to the first transmission unit GPM, the first transmission unit GPM ending the transmission of signals $SIG_{SG}$ when the distance $D_{GPM\text{-}CPM}$ ascertained from the relative position $\Delta POS$ is smaller than a predefined limit value G2.

A third aspect of the invention relates to a method for operating a vehicle charging system, according to the first aspect of the invention, for charging an energy store arranged in a vehicle F, including a first transmission unit GPM, which has a primary coil with a coil axis $SPA_P$ and is arranged outside of the vehicle in a stationary manner, in particular, and a second transmission unit CPM, which has a secondary coil with a coil axis $SPA_S$ and is arranged in the vehicle, wherein energy is transmitted via an inductive energy transmission from the primary coil to the secondary coil, wherein the second transmission unit CPM has a signal generator, and the first transmission unit GPM has an evaluation unit and at least one first auxiliary coil with a coil axis $SPA_{H1}$ and one second auxiliary coil with a coil axis $SPA_{H2}$, including the following steps.

In a first step, the signal generator SG generates and couples signals $SIG_{SG}$ in order to transmit the signals into the secondary coil.

In a further step, a magnetic coupling $k_{mag}$ and the relative position $\Delta POS$ between the first transmission unit GPM and the second transmission unit CPM are ascertained on the basis of the signals $SIG_{SG}$ received by the primary coil and the auxiliary coils, and a magnetic coupling $k_{mag}$ and/or the relative position $\Delta POS$ is provided at an interface for further use.

The advantageous embodiments of this method for operating the vehicle charging system according to the first aspect of the invention and the advantages thereof arise from an analogous and appropriate transfer of the statements relating to the first aspect of the invention to the method according to the third aspect of the invention, in particular as follows.

The first auxiliary coil and the second auxiliary coil are advantageously arranged and oriented relative to the primary coil and relative to one another. The coil axes $SPA_{H1}$ and $SPA_{H2}$ are advantageously each aligned substantially orthogonally with respect to the coil axis $SPA_P$ of the primary coil and substantially orthogonally with respect to one another. The evaluation unit advantageously ascertains the relative position $\Delta POS$ on the basis of the respective amplitudes and phase positions of the signals $SIG_{SG}$ received by the primary coil and the auxiliary coils. The relative position $\Delta POS$ advantageously indicates a relative position of the primary coil and the secondary coil. The relative position $\Delta POS$ is advantageously a two-dimensional relative position $\Delta POS(\Delta x, \Delta y)$ or a three-dimensional relative position $\Delta POS(\Delta x, \Delta y, \Delta z)$. The evaluation unit advantageously ascertains the magnetic coupling $k_{mag}$ on the basis of a voltage $U_2$ generated in the secondary coil for the transmission of the signal $SIG_{SG}$ or on the basis of a current $I_2$ generated in the secondary coil, a voltage $U_1$ or current $I_1$ induced in the primary coil on receipt of the signal $SIG_{SG}$, and the predefined self-inductances L1 and L2 of the primary coil and the secondary coil.

The second transmission unit CPM advantageously transmits the voltage $U_2$ or the current $I_2$ generated in the secondary coil for the transmission of the signal $SIG_{SG}$ to the first transmission unit GPM. The second transmission unit CPM advantageously transmits the self-inductance L2 of the secondary coil to the first transmission unit GPM. The second transmission unit CPM advantageously ends the transmission of signals $SIG_{SG}$ when the magnetic coupling $k_{mag}$ is greater than a predefined limit value G1.

The first transmission unit GPM advantageously transmits the relative position $\Delta POS$ or a distance $D_{GPM-CPM}$ between the first and the second transmission unit ascertained from the relative position $\Delta POS$ to the second transmission unit CPM, the second transmission unit CPM ending the transmission of signals $SIG_{SG}$ when the distance $D_{GPM-CPM}$ ascertained from the relative position $\Delta POS$ is smaller than a predefined limit value G2.

The energy transmission from the primary coil to the secondary coil in order to charge the energy store is advantageously only initialized when the ascertained magnetic coupling $k_{mag}$ is greater than a predefined limit value G3 and/or when the distance $D_{GPM-CPM}$ ascertained from the relative position $\Delta POS$ between the first transmission unit GPM and the second transmission unit CPM is smaller than a predefined limit value G4.

A fourth aspect of the invention relates to a method for operating a vehicle charging system, according to the second aspect of the invention, for charging an energy store arranged in a vehicle F, including a first transmission unit GPM, which has a primary coil with a coil axis $SPA_P$ and is arranged outside of the vehicle in a stationary manner, in particular, and a second transmission unit CPM, which has a secondary coil with a coil axis $SPA_S$ and is arranged in the vehicle F, wherein energy is transmitted via an inductive energy transmission from the primary coil to the secondary coil, wherein the first transmission unit GPM has a signal generator, and the second transmission unit CPM has an evaluation unit and at least one first auxiliary coil with a coil axis $SPA_{H1}$ and one second auxiliary coil with a coil axis $SPA_{H2}$, including the following steps.

In a first step, the signal generator SG generates and couples signals $SIG_{SG}$ in order to transmit the signals into the primary coil.

In a further step, a magnetic coupling $k_{mag}$ and/or the relative position $\Delta POS$ between the first transmission unit GPM and the second transmission unit CPM is ascertained on the basis of the signals $SIG_{SG}$ received by the secondary coil and the auxiliary coils, and a magnetic coupling $k_{mag}$ and the relative position $\Delta POS$ are provided at an interface for further use.

The advantageous embodiments of this method (fourth aspect of the invention) for operating the vehicle charging system according to the second aspect of the invention and the advantages thereof arise from an analogous and appropriate transfer of the statements relating to the second aspect of the invention to this method, in particular, as follows.

The first auxiliary coil and the second auxiliary coil are advantageously arranged and oriented relative to the secondary coil and relative to one another. The coil axes $SPA_R$ and $SPA_{H2}$ are advantageously each aligned substantially orthogonally with respect to the coil axis $SPA_P$ of the secondary coil and substantially orthogonally with respect to one another. The evaluation unit advantageously ascertains the relative position $\Delta POS$ on the basis of the respective amplitudes and phase positions of the signals $SIG_{SG}$ received by the secondary coil and the auxiliary coils.

The evaluation unit advantageously ascertains the magnetic coupling $k_{mag}$ on the basis of a voltage $U_1$ generated in the primary coil for the transmission of the signal $SIG_{SG}$ or on the basis of a current $I_1$ generated in the primary coil, a voltage $U_2$ or current $I_2$ induced in the secondary coil on receipt of the signal $SIG_{SG}$, and the predefined self-inductances L1 and L2 of the primary coil and the secondary coil.

The first transmission unit GPM advantageously transmits the voltage $U_1$ or the current $I_1$ generated in the primary coil for the transmission of the signal $SIG_{SG}$ to the second transmission unit CPM. The first transmission unit GPM advantageously transmits the self-inductance L1 of the primary coil to the second transmission unit CPM.

The first transmission unit GPM advantageously ends the transmission of signals $SIG_{SG}$ when the magnetic coupling $k_{mag}$ is greater than a predefined limit value G1. The second transmission unit CPM advantageously transmits the relative position POS or a distance $D_{GPM-CPM}$ between the first and the second transmission unit ascertained from the relative position POS to the first transmission unit GPM, the first transmission unit GPM ending the transmission of signals $SIG_{SG}$ when the distance $D_{GPM-CPM}$ ascertained from the relative position POS is smaller than a predefined limit value G2.

Further advantages, features, and details result from the following description, in which—if necessary with reference to the drawings—at least one example embodiment is described in detail. Identical, similar, and/or functionally identical parts are provided with the same reference numerals.

DETAILED DESCRIPTION

Figure 1:
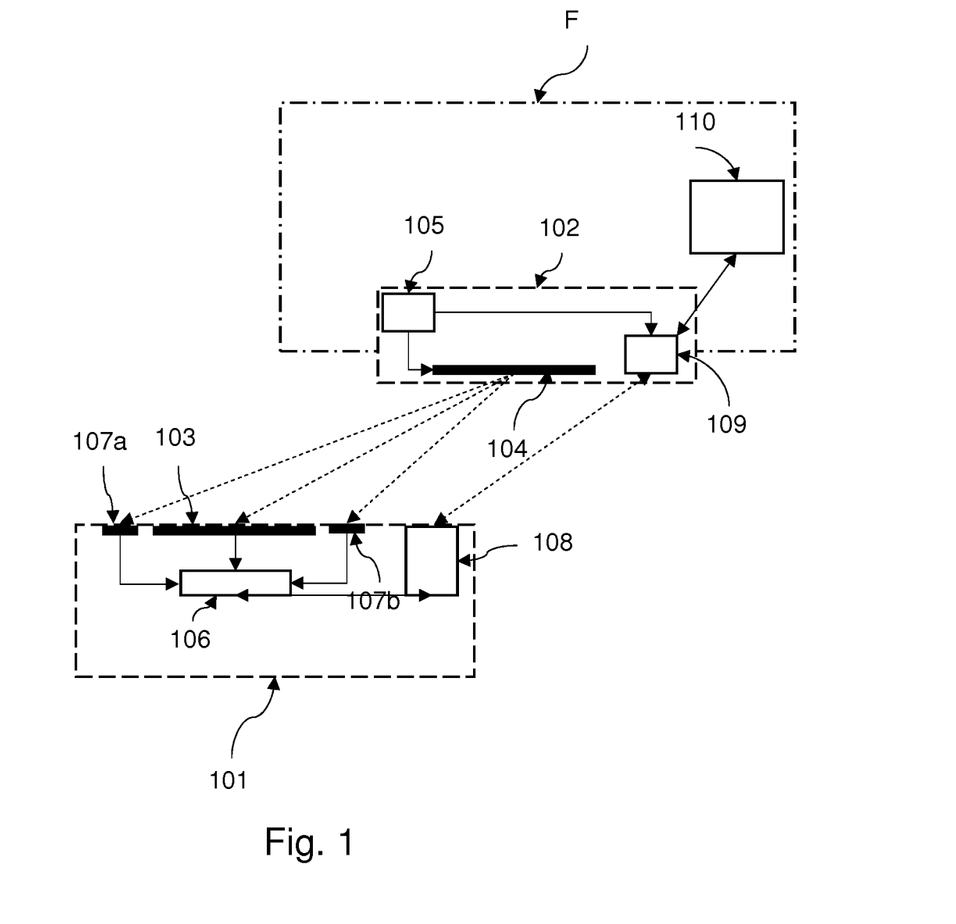
FIG. 1 is a highly schematic structure of a vehicle charging system according to the invention.

FIG. 1 is a highly schematic structure of a vehicle charging system according to the invention for charging an energy store arranged in a vehicle F. The vehicle charging system shown in FIG. 1 includes a first transmission unit GPM 101, which has a primary coil 103 with a coil axis $SPA_P$ (not shown) and is arranged on the ground outside of the vehicle in a stationary manner. The vehicle charging system further includes a second transmission unit CPM 102, which has a secondary coil 104 with a coil axis $SPA_S$ (not shown) and is arranged in the vehicle F. The energy transmission in order to charge the energy store via an inductive energy transmission takes place from the primary coil 103 to the secondary coil 104.

All components relating to the transmitting and receiving of the inductive charging energy for the energy store in the second transmission unit CPM 102 have been omitted in FIG. 1 for the sake of clarity.

Before the inductive energy transmission can be initiated/activated in the first transmission unit GPM, the presence of a second transmission unit CPM in a vehicle F, the relative position thereof and the current magnetic coupling between the first transmission unit GPM and the second transmission unit CPM must first be ascertained, wherein the inductive transmission transfer is only initiated when the ascertained relative position $\Delta POS$ and the ascertained magnetic coupling $k_{mag}$ satisfy the specified conditions.

The second transmission unit CPM 102 arranged in the vehicle F has a signal generator SG 105 for generating signals $SIG_{SG}$, the signal generator coupling the signals $SIG_{SG}$ into the secondary coil 104 in order to transmit the signals via the secondary coil. In the present case, the signal generator SG 105 is also connected to a transmitting/receiving unit 109 that, among other things, transmits the following information via a WLAN signal: identifier of the second transmission unit CPM 102, electrical status of the transmission unit CPM 102, the voltage $U_2$ or current $I_2$ generated in the secondary coil 104 for the transmission of the signals $SIG_{SG}$ and the inductance L2 of the secondary coil 104. The dashed arrows emanating from the secondary coil 104 represent the transmitted signals $SIG_{SG}$.

The transmitting/receiving unit 109 of the second transmission unit CPM 102 is also connected to a vehicle-mounted control unit 110 that controls in particular an autonomous longitudinal and/or lateral control of the vehicle F and/or controls the output/display of information in the vehicle F for optimum relative positioning of the first transmission unit GPM 101 with respect to the second transmission unit CPM 102.

The first transmission unit GPM 101 has an evaluation unit 106 and at least one first auxiliary coil 107a with a coil axis $SPA_{H1}$ (not shown) and one second auxiliary coil 107b with a coil axis $SPA_{H2}$ (not shown). The coil axes $SPA_{H1}$ and $SPA_{H2}$ are each aligned substantially orthogonally with respect to the coil axis $SPA_P$ of the primary coil and substantially orthogonally with respect to one another.

The evaluation unit 106 is configured to ascertain a current magnetic coupling $k_{mag}$ and the current relative position POS between the first transmission unit GPM 101 and the second transmission unit CPM 102 on the basis of the signals $SIG_{SG}$ received by the primary coil 103 and the auxiliary coils 107a,b. The evaluation unit 106 is connected to a transmitting/receiving unit 108 such that the ascertained values for the magnetic coupling $k_{mag}$ and for the relative position POS as well as a distance $D_{GPM\text{-}CPM}$ ascertained therefrom between the first and the second transmission unit are transmitted to the second transmission unit CPM 102, specifically via the data connection between the transmitting/receiving units 108 and 109. The data on the current relative position POS and on the magnetic coupling $k_{mag}$ are transmitted from the transmitting/receiving unit 109 to the vehicle-mounted control unit 110 and used by the latter for the autonomous longitudinal and lateral control of the vehicle F such that the vehicle F autonomously optimally positions the second transmission unit CPM 102 relative to the first transmission unit GPM 101.

If such optimal positioning has taken place, which can be seen on the basis of predefined limit values, in particular for the magnetic coupling $k_{mag}$, and if the vehicle F has been placed in a parked state such that no further movement of the vehicle F is to be expected, the inductive energy transmission in order to charge the vehicle-mounted energy store is initiated.

Figure 2:
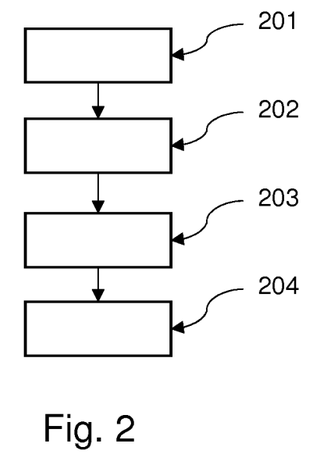
FIG. 2 is a highly schematic flowchart of a method according to the invention for operating a vehicle charging system.

FIG. 2 is a highly schematic flowchart of a method according to the invention for operating a vehicle charging system as described above in FIG. 1. The method includes the following steps.

In a first step 201, the signal generator SG 105 generates and couples signals $SIG_{SG}$ in order to transmit the signals into the secondary coil 104.

In a further step 202, a magnetic coupling $k_{mag}$ and the relative position POS between the first transmission unit GPM 101 and the second transmission unit CPM 102 are ascertained on the basis of the signals $SIG_{SG}$ received by the primary coil 103 and the auxiliary coils 107a,b.

In a further step 203, the ascertained magnetic coupling $k_{mag}$ and the relative position POS as well as a distance $D_{GPM\text{-}CPM}$ derived therefrom between the first and the second transmission unit are transmitted to the second transmission unit CPM 102. This data is transmitted between the transmitting unit 108 and the receiving unit 109. The data is transferred using a WLAN protocol. The transmitted data are used, in particular, for forwarding to the vehicle control-mounted unit 110 for autonomous lateral and/or longitudinal control of the vehicle F or for outputting/displaying this information in the vehicle.

In a further step 204, a check is carried out as to whether the magnetic coupling $k_{mag}$ and the relative position ΔPOS and the distance $D_{GPM\text{-}CPM}$ satisfy the correspondingly specified conditions. This check can take place in the first transmission unit GPM 101 or in the second transmission unit CPM 102. The inductive energy transmission from the primary coil to the secondary coil is only initiated when the specified conditions are met.

In the present embodiment, the transmission of the signals $SIG_{SG}$, the reception thereof and the evaluation thereof are continued during an inductive energy transmission in order to charge the energy store. If there are changes in the magnetic coupling $k_{mag}$, the relative position ΔPOS or the distance $D_{GPM\text{-}CPM}$ that do not meet the specified conditions, the inductive energy transmission in order to charge the energy store is stopped instantaneously.

Although the invention has been illustrated and explained in greater detail by preferred example embodiments, the invention is not limited by the disclosed examples and other variations may be derived therefrom by a person skilled in the art without departing from the scope of protection of the invention. It is therefore clear that there is a plurality of possible variations. It is also clear that embodiments cited by way of example actually only constitute examples that are not to be interpreted in any way as a limitation of the scope, of the potential applications, or of the configuration of the invention. Instead, the preceding description and the description of the figures enable the person skilled in the art to specifically implement the example embodiments, wherein the person skilled in the art has knowledge of the disclosed inventive concept and is able to make numerous changes, for example, with respect to the function or the arrangement of individual elements cited in an exemplary embodiment, without departing from the scope of protection, which is defined by the claims and their legal equivalents, such as a further explanation in the description.

LIST OF REFERENCE SIGNS

101 first transmission unit GPM
102 second transmission unit CPM
103 primary coil
104 secondary coil
105 signal generator SG
106 evaluation unit
107a first auxiliary coil
107b second auxiliary coil
108,109 transmitting/receiving unit for data communication
110 vehicle-mounted control unit
201-204 method steps

The invention claimed is:

1. A vehicle charging system to charge an energy store arranged in a vehicle F, the system comprising a first transmission unit GPM, Which comprises a primary coil with a coil axis $SPA_P$ and is arranged outside of the vehicle F in a stationary manner, and a second transmission unit CPM, Which comprises a secondary coil with a coil axis $SPA_S$ and is arranged in the vehicle F, wherein energy is transmitted via an inductive energy transmission from the primary coil to the secondary coil in order to charge the energy store, Wherein:

the second transmission unit CPM comprises a signal generator SG, the signal generator SG being configured to generate signals $SIG_{SG}$ and couple the signals $SIG_{SG}$ into the secondary coil in order to transmit the signals via the secondary coil; and the first transmission unit GPM comprises an evaluation unit and at least one first auxiliary coil with a coil axis $SPA_{H1}$ and one second auxiliary coil with a coil axis $SPA_{H2}$, the evaluation unit being configured to ascertain a magnetic coupling $k_{mag}$ and a relative position ΔPOS between the first transmission unit GPM and the second transmission unit CPM based on the signals $SIG_{SG}$ received by each of the primary coil, the first auxiliary coil, and the secondary auxiliary coil, wherein the evaluation unit is configured to:

ascertain the magnetic coupling $k_{mag}$ based on a voltage $U_2$ generated in the secondary coil for transmission of the signal $SIG_{SG}$ or based on a current $I_2$ generated in the secondary coil, a voltage $U_1$ or a current $I_1$ induced in the primary coil on receipt of the signal $SIG_{SG}$, and predefined self-inductances L1 and L2 of the primary coil and the secondary coil based on a formula (1):

$$k_{mag} = \frac{U_1 \cdot L_2}{U_2 \cdot \sqrt{L_1 \cdot L_2}}, \quad (1)$$

ascertain the relative position ΔPOS based on respective amplitudes and phase positions of the signals $SIG_{SG}$ received by the primary coil, the first auxiliary coil, and the second auxiliary coil; and wherein the second transmission unit CPM is configured to end transmission of signals $SIG_{SG}$ when the magnetic coupling $k_{mag}$ is greater than a predefined limit value G1 and/or the inductive energy transmission from the primary coil to the secondary coil in order to charge the energy store is initialized when the ascertained magnetic coupling $k_{mag}$ is greater than a predefined limit value G3.

2. The vehicle charging system according to claim 1, wherein the first auxiliary coil and the second auxiliary coil are arranged and oriented relative to the primary coil and relative to one another.

3. The vehicle charging system according to claim 1, wherein the coil axis $SPA_{H1}$ and the coil axis $SPA_{H2}$ are each aligned substantially orthogonally with respect to the coil axis $SPA_P$ of the primary coil and substantially orthogonally with respect to one another.

4. The vehicle charging system according to claim 1, wherein the second transmission unit CPM is further configured to end transmission of signals $SIG_{SG}$ when a distance $D_{GPM\text{-}CPM}$ ascertained from the relative position ΔPOS between the first transmission unit GPM and the second transmission unit CPM is less than a predefined limit value G2.

5. The vehicle charging system according to claim 1, wherein the inductive energy transmission from the primary coil to the secondary coil in order to charge the energy store is further initialized when a distance $D_{GPM\text{-}CPM}$ ascertained from the relative position ΔPOS between the first transmission unit GPM and the second transmission unit CPM is smaller than a predefined limit value G4.

6. A method of operating a vehicle charging system according to claim 1, the method comprising:

generating and coupling signals $SIG_{SG}$ by the signal generator SG in order to transmit the signals into the secondary coil; and ascertaining the magnetic coupling $k_{mag}$ and the relative position ΔPOS between the first transmission unit GPM and the second transmission unit GPM based on the signals $SIG_{SG}$ received by each of the primary coil, the first auxiliary coil, and the second auxiliary coil, wherein the magnetic coupling $k_{mag}$ is ascertained based on a voltage $U_2$ generated in the secondary coil for transmission of the signal $SIG_{SG}$ or based on a current $I_2$ generated in the secondary coil, a voltage $U_1$ or a current $I_1$ induced in the primary coil on receipt of the signal $SIG_{SG}$, and predefined self-inductances L1 and L2 of the primary coil and the secondary coil based on a formula (1):

$$k_{mag} = \frac{U_1 \cdot L_2}{U_2 \cdot \sqrt{L_1 \cdot L_2}}, \quad (1)$$

and the relative position ΔPOS is ascertained based on respective amplitudes and phase positions of the signals $SIG_{SG}$ received by the primary coil, the first auxiliary coil, and the second auxiliary coil; and ending transmission of the signals $SIG_{SG}$ when the magnetic coupling $k_{mag}$ is greater than the predefined limit value G1 and/or initializing the inductive energy transmission from the primary coil to the secondary coil in order to charge the energy store when the ascertained magnetic coupling $k_{mag}$ is greater than the predefined limit value G3.

7. A vehicle charging system to charge an energy store arranged in a vehicle F, the system comprising a first transmission unit GPM, which comprises a primary coil with a coil axis $SPA_P$ and is arranged outside of the vehicle F in a stationary manner, and a second transmission unit CPM, Which comprises a secondary coil with a coil axis $SPA_S$ and is arranged in the vehicle F, wherein energy is transmitted via an inductive energy transmission from the primary coil to the secondary coil, wherein:

the first transmission unit GPM comprises a signal generator SG, the signal generator SG being configured to generate signals $SIG_{SG}$ and couple the signals $SIG_{SG}$ into the primary coil in order to transmit the signals via the primary coil; and the second transmission unit CPM comprises an evaluation unit and at least one first auxiliary coil with a coil axis $SPA_{H1}$ and one second auxiliary coil with a coil axis $SPA_{H2}$, the evaluation unit being configured to ascertain and provide at an interface for further use a magnetic coupling $k_{mag}$ and a relative position ΔPOS between the first transmission unit GPM and the second transmission unit CPM based on the signals $SIG_{SG}$ received by each of the secondary coil, the first auxiliary coil, and the second auxiliary coil, wherein the evaluation unit is configured to:

ascertain the magnetic coupling $k_{mag}$ based on a voltage $U_2$ generated in the primary coil for transmission of the signals $SIG_{SG}$ or based on a current $I_2$ generated in the primary coil, a voltage $U_1$ or a current $I_1$ induced in the secondary coil on receipt of the signals $SIG_{SG}$, and predefined self-inductances L1 and L2 of the primary coil and the secondary coil based on a formula (1):

$$k_{mag} = \frac{U_1 \cdot L_2}{U_2 \cdot \sqrt{L_1 \cdot L_2}}, \quad (1)$$

and
ascertain the relative position ΔPOS based on respective amplitudes and phase positions of the signals $SIG_{SG}$ received by the secondary coil the first auxiliary coil, and the second auxiliary coil, and
wherein the first transmission unit GPM is configured to end transmission of signals $SIG_{SG}$ When the magnetic coupling $k_{mag}$ is greater than a predefined limit value G1 and/or the inductive energy transmission from the primary coil to the secondary coil in order to charge the energy store is initialized when the ascertained magnetic coupling $k_{mag}$ is eater than a predefined limit value G3.

8. The vehicle charging system according to claim 7, wherein the first auxiliary coil and the second auxiliary coil are arranged and oriented relative to the secondary coil and relative to one another.

9. The vehicle charging system according to claim 7, wherein the coil axis $SPA_{H1}$ and the coil axis $SPA_{H2}$ are each aligned substantially orthogonally with respect to the coil axis SP As of the secondary coil and substantially orthogonally with respect to one another.

10. The vehicle charging system according to claim 7, wherein the first transmission unit GPM is further configured to end transmission of signals $SIG_{SG}$ when a distance $D_{GPM-CPM}$ ascertained from the relative position ΔPOS between the first transmission unit GPM and the second transmission unit CPM is less than a predefined limit value G2.

11. The vehicle charging system according to claim 7, wherein the inductive energy transmission from the primary coil to the secondary coil in order to charge the energy store is further initialized when a distance $D_{GPM-CPM}$ ascertained from the relative position ΔPOS between the first transmission unit GPM and the second transmission unit CPM is smaller than a predefined limit value G4.

12. A method of operating a vehicle charging system according to claim 7, the method comprising:
generating and coupling signals $SIG_{SG}$ by the signal generator SG in order to transmit the signals into the primary coil; and
ascertaining the magnetic coupling $k_{mag}$ and the relative position ΔPOS between the first transmission unit GPM and the second transmission unit CPM based on the signals $SIG_{SG}$ received by each of the secondary coil, the first auxiliary coil, and the second auxiliary coil, wherein
the magnetic coupling $k_{mag}$ is ascertained based on a voltage $U_2$ generated in the primary coil for transmission of the signals $SIG_{SG}$ or based on a current generated in the primary coil, a voltage $U_1$ or a current $I_1$ induced in the secondary coil on receipt of the signals $SIG_{SG}$ and the predefined self-inductances L1 and L2 of the primary coil and the secondary coil based on a formula (1):

$$k_{mag} = \frac{U_1 \cdot L_2}{U_2 \cdot \sqrt{L_1 \cdot L_2}}, \quad (1)$$

and
the relative position ΔPOS is ascertained based on respective amplitudes and phase positions of the signals $SIG_{SG}$ received by the secondary coil, the first auxiliary coil, and the second auxiliary coil; and
ending transmission of the signals $SIG_{SG}$ when the magnetic coupling $k_{mag}$ is greater than a predefined limit value G1 and/or initializing the inductive energy transmission from the primary coil to the secondary coil when the ascertained magnetic coupling $k_{mag}$ is greater than a predefined limit value G3.

* * * * *